US006802135B2

United States Patent
Jordil et al.

(10) Patent No.: US 6,802,135 B2
(45) Date of Patent: Oct. 12, 2004

(54) COLUMN FOR MEASURING LONGITUDINAL DIMENSIONS

(75) Inventors: Pascal Jordil, Ecoteaux (CH); Adriano Zanier, Prilly (CH)

(73) Assignee: Tesa SA, Renens (CH)

( * ) Notice: Subject to any disclaimer, the term of this patent is extended or adjusted under 35 U.S.C. 154(b) by 0 days.

(21) Appl. No.: 10/314,717

(22) Filed: Dec. 9, 2002

(65) Prior Publication Data

US 2003/0106234 A1 Jun. 12, 2003

(30) Foreign Application Priority Data

Dec. 12, 2001 (EP) .............................................. 01811218

(51) Int. Cl.⁷ ................................................ G01B 5/02
(52) U.S. Cl. .......................................................... 33/832
(58) Field of Search ..................................... 33/832, 833

(56) References Cited

U.S. PATENT DOCUMENTS

| | | | |
|---|---|---|---|
| 4,149,317 A | | 4/1979 | Reiff et al. ................... 33/1 M |
| 4,459,755 A | * | 7/1984 | Gruhler ........................ 33/832 |
| 5,072,522 A | * | 12/1991 | Stott et al. ..................... 33/503 |
| 5,373,645 A | | 12/1994 | Bezinge et al. ................ 33/832 |

FOREIGN PATENT DOCUMENTS

JP        07253301        10/1995

* cited by examiner

Primary Examiner—Christopher W. Fulton
(74) Attorney, Agent, or Firm—Pearne & Gordon LLP

(57) ABSTRACT

Column for measuring longitudinal dimensions (1) comprising:

- a supporting frame (2),
- a carriage (3) capable of moving along a measuring axis (z) along the supporting frame,
- a cable or belt (40) for moving said carriage along said measuring axis,
- a counterweight connected to said cable or belt so as to move in opposite direction from the carriage,
- a guiding surface for restricting the counterweight's movements.

A play of 1 millimeter is provided between said counterweight and said guiding surface. This play is sufficient to avoid any contact between said counterweight and any guiding surface when said counterweight is displaced vertically.

13 Claims, 3 Drawing Sheets

COLUMN FOR MEASURING LONGITUDINAL DIMENSIONS

This application claims priority of European Patent Application EP01811218.5, the content of which is hereby incorporated.

FIELD OF THE INVENTION

The present invention concerns a measuring machine, notably a column for measuring longitudinal dimensions, for example a height-measuring column.

RELATED ART

Height-measuring columns are described for example in document U.S. Pat. No. 4,924,598. They are used for example for measuring or comparing dimensions, for example in mechanical workshops. A measuring column generally comprises a fixed supporting frame with a base, a carriage that can be displaced vertically along the supporting frame, a device for driving the carriage and a system for measuring the carriage's vertical position. A probe tip is connected to the carriage and is designed for being brought into contact with the piece to be measured. Some measuring columns comprise a base provided with means for creating an air-cushion in order to easily displace the height-measuring column on the work surface.

The measuring column described in U.S. Pat. No. 4,924,598 comprises an electric motor lodged in the base and driving the lower pulley through an axle or transmission belt. The lower pulley drives a driving belt coupled to the carriage, as well as a counterweight moving in opposite direction from the carriage. The driving belt is tensed between the lower and the upper pulleys. The carriage comprises wheels for pressing on the guiding rails attached to the supporting frame.

The electronic measuring system allows the position of the carriage, and thus of the probe tip, to be determined and displayed on an electronic display. The resolution and precision that is expected of this type of measuring columns is on the order of the micron.

This precision depends for an important part on the contact force between the probe tip and the piece to be measured. A substantial contact force causes a flexion of the probe tip and/or of the piece, or even an elastic deformation of the material, that can influence the measuring. The contact force between the probe tip and the piece to be measured must thus be minimal or, in any case, identical at each measuring.

It is thus essential to ensure that the traction force exerted by the cable or belt on the carriage should be reproducible whatever the carriage's longitudinal position. For this purpose, it is necessary to design the column so that the driving of the carriage should be as soft and regular as possible. In particular, it is necessary to prevent as much as possible any shocks and jerks.

As previously mentioned, measuring columns are however often moved on an air-cushion during measuring. The carriage is displaced vertically by means of the motor. The probe tip comes into contact with the piece to be measured. The operator handles the control panel or the height-regulating wheel. The measuring column is thus subjected to different types of shocks and accelerations during a normal measuring session.

It has been observed within the framework of these inventions that these accelerations sometimes cause the counterweight to swing. The latter is suspended by the driving cable or belt and is thus free to move laterally. When the counterweight is at the bottom of the column, shocks can cause a swinging of the counterweight of relatively great amplitude and which dies only very slowly. This is in particular the case with modern measuring columns in which the tension of the cable or belt is weak so as to limit the forces and moments exerted on the measuring carriage. In this case, the driving belt exerts only a limited braking force on the swinging counterweight.

This swinging causes a variable traction on the driving belt or cable that is reflected on the carriage and the probe tip. The pressing force of the probe tip on the piece to be measured is influenced by this traction, which greatly disturbs the measuring.

Furthermore, substantial swinging of the counterweight can also occur during transportation of the measuring column and can possibly even damage it.

U.S. Pat. No. 4,399,617 describes a measuring column in which the counterweight is guided by a rod traversing it through a longitudinal opening in its middle. The counterweight does not move freely but slides around this rod. Any possibility of swinging is thus prevented. The friction between the counterweight and the central rod however creates an additional tension on the driving cables, which are reflected on the measuring carriage and generate additional constraints. If the rod is not perfectly vertical, the friction further depends on the counterweight's vertical position, causing a pressing force that varies according to the carriage's position. The rod and the opening through the counterweight must be manufactured with a high accuracy to ensure a constant friction on the entire course run by the counterweight; this requirement leads to a considerable cost increase.

It is an aim of the present invention to propose a column for measuring longitudinal dimensions that avoids the disadvantages of the prior art columns. In particular, it is an aim of the present invention to make a column for measuring longitudinal dimensions in which the disturbances caused by the counterweight are reduced to a minimum.

BRIEF SUMMARY OF THE INVENTION

According to the invention, these aims are achieved by means of a measuring column comprising the characteristics of claim 1, preferred embodiments being furthermore indicated in the dependent claims.

In particular, these aims are achieved by means of a guiding surface for restricting the counterweight's movements. A play is provided between the counterweight and the guiding surface; this play is sufficient to avoid any contact between the counterweight and any guiding surface when the counterweight is displaced vertically.

This has the advantage that the counterweight's swinging can be greatly reduced without however creating an additional friction. Possible oscillations of the counterweight can be only of very limited amplitude and will thus die very quickly.

The selected play between the guiding surface and the counterweight is the result of a compromise. A play that would be too considerable is insufficient for preventing the disturbances caused by the counterweight's swinging. A very restricted play entails close manufacturing tolerances to avoid any contact between the counterweight and the guiding surface. If the play is insufficient, even a very accurate manufacturing process will not prevent the risk of collisions when the measuring column is placed on a surface that is not absolutely horizontal.

Tests and trials have shown that the risk of collision between the counterweight and the guiding surface increases rapidly when the play is less than 0.2 millimeters. On the other hand, a play less than 5 millimeters is generally sufficient, in the case of medium-height measuring columns, for the time required for the counterweight's swinging to die to be comparable to the time required for performing the measurement and stabilizing the carriage. The optimal value of the play is thus comprised between 0.2 and 5 millimeters, preferably between 0.5 and 2 millimeters. Conclusive trials have notably been effected using a play of 1 millimeter.

DESCRIPTION OF THE DRAWINGS

The invention will be better understood by reading the description of a preferred embodiment given by way of example and illustrated by the attached drawings, in which.

DETAILED DESCRIPTION OF THE INVENTION

Figure 1:
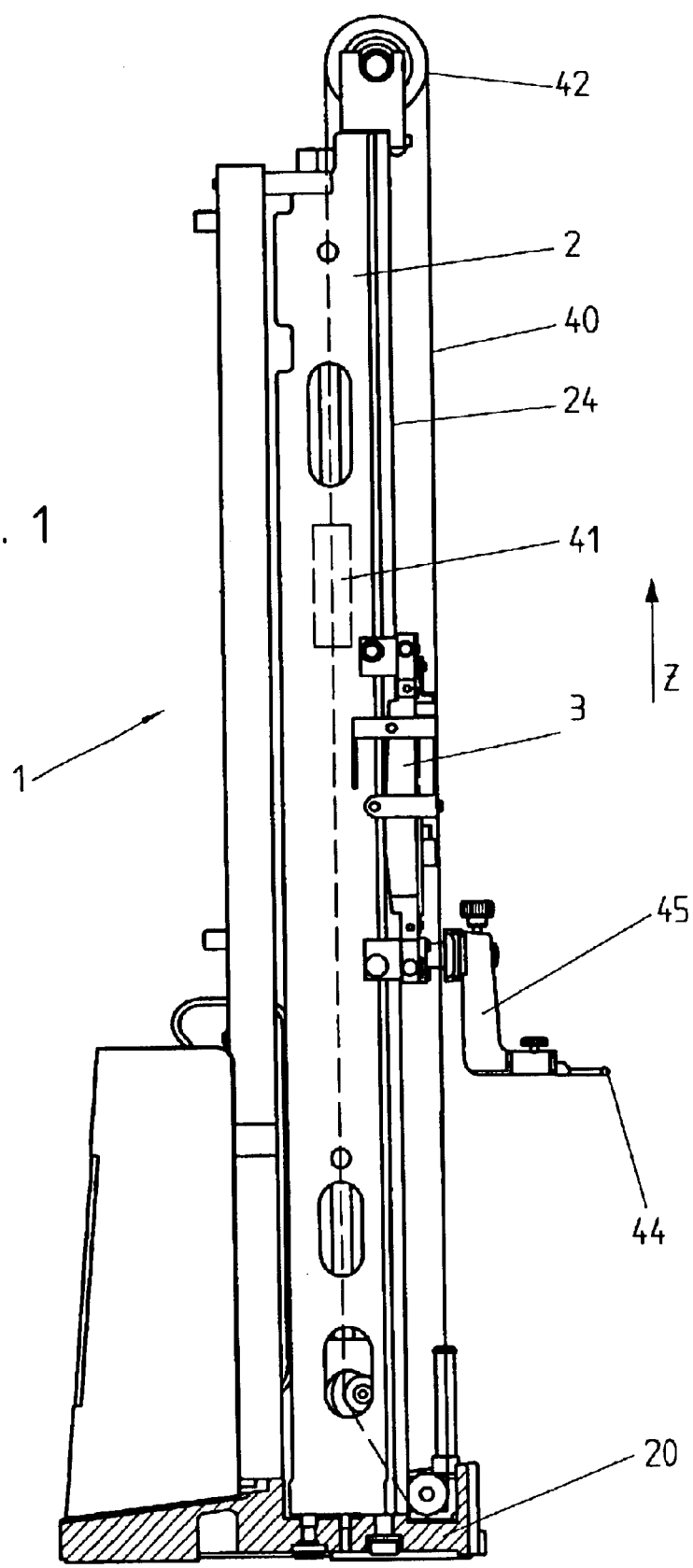
FIG. 1 shows a lateral view of a column for measuring longitudinal dimensions according to the invention.

An embodiment of the measuring column according to the invention comprises a vertical supporting frame 2 mounted perpendicularly on a base 20. The supporting frame is hollow and comprises a front side provided with a rule (not represented) and with guiding rails 24. The rule is provided with capacitive or magnetic electrodes, for example, that allow a measuring of the absolute or relative position by means of a sensor (not represented) mounted on the carriage 3. The rails 24 can be added to, or preferably worked on to the supporting frame 2 and constitute a plane supporting surface on which the wheels of the carriage 3 move. Other rails on the rear side of the supporting frame 2 form a rear rolling surface for additional wheels.

A motorized driving mechanism linked to the supporting frame comprises an upper pulley 42 and a lower pulley (not represented). The driving mechanism further comprises a motor that enables the upper pulley 42 to be driven in rotation, as well as a driving cable or belt 40 forming a loop tensed between the two pulleys. The carriage 3 is fastened on the first end of the driving belt 40 and can thus be driven along the vertical axis z by means of the motor. The counterweight 41 fastened on the other end of the belt 40 moves in opposite direction to the carriage 3 inside the supporting frame 2. The traction force of the belt 40 is controlled precisely for example by means of a friction element between the motor and the driving pulley and/or by controlling the motor's driving torque.

A probe tip 44 is mounted on the carriage 3 by means of a tip holder 45. The spherical extremity of the probe tip 44 is designed to be brought into contact with the piece to be measured. A measuring system of the capacitive, inductive, opto-electronic or magneto-resistive type allows the position of the probe tip 44 or the displacement effected by the probe tip 44 between two measure points to be displayed on an electronic display (not represented). The measuring system comprises for example an electronic sensor mounted on the carriage 3 opposite the rule 22 and connected by a flexible cable mat (not represented), possibly by a local radio connection, to a measuring control and display panel.

Figure 2:
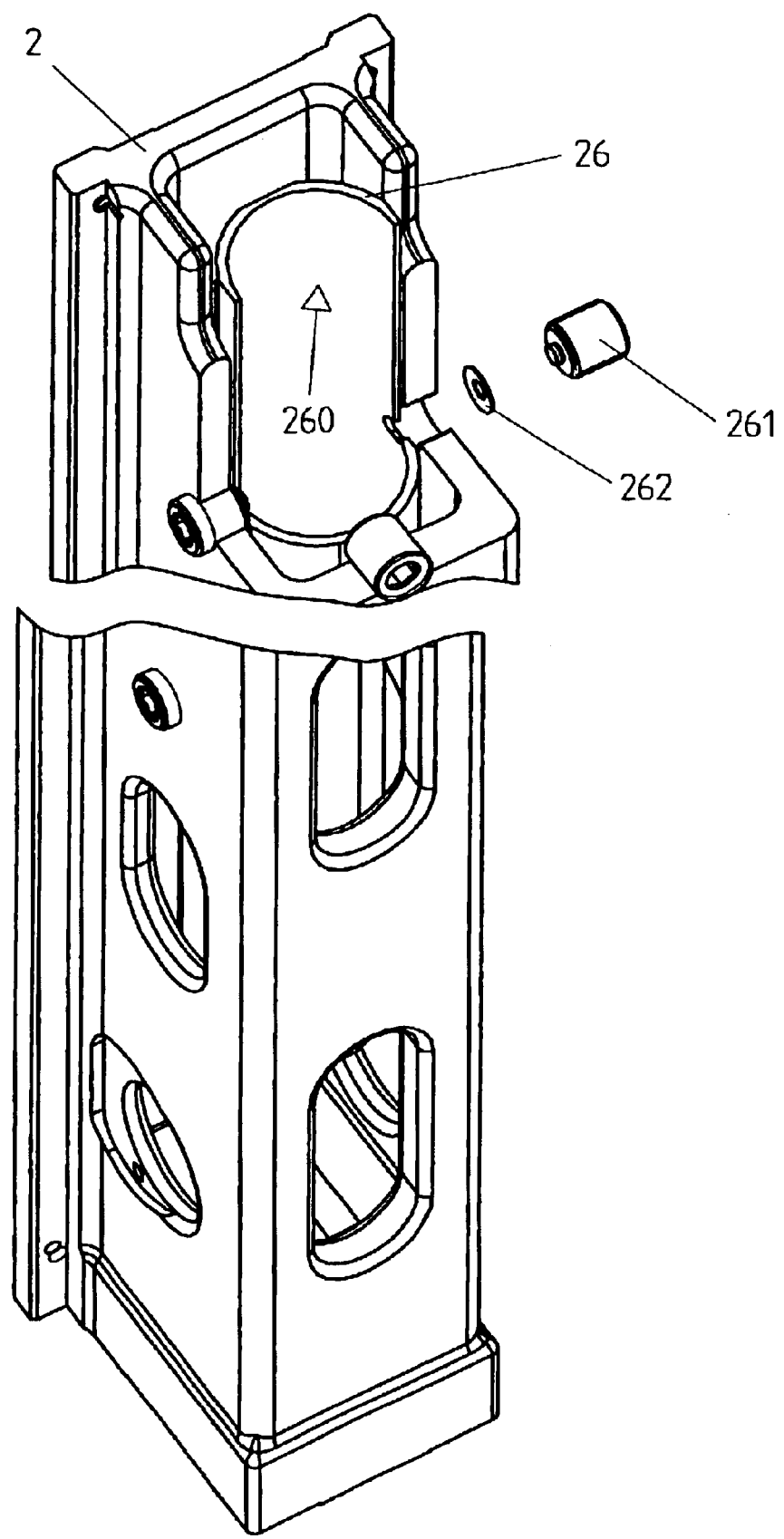
FIG. 2 shows a view in perspective of a portion of the guiding tube according to the invention.
Figure 3:
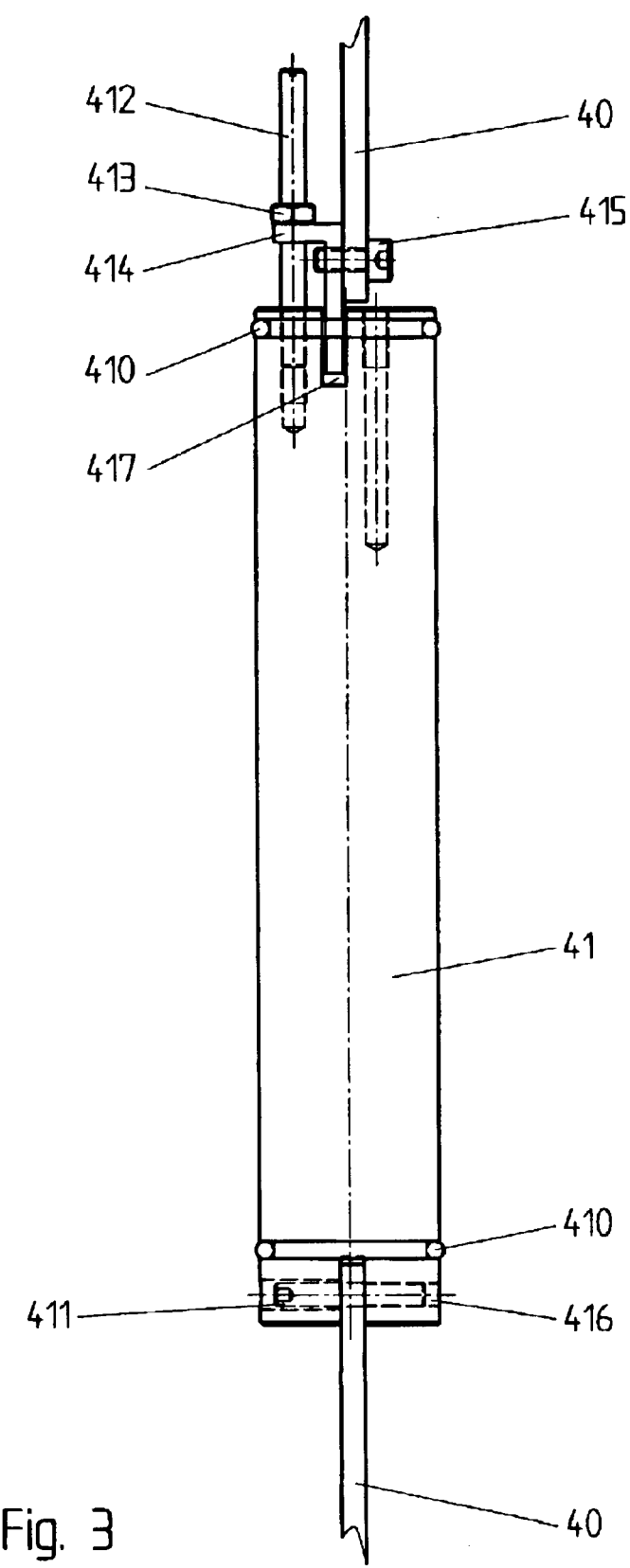
FIG. 3 shows a lateral view of the counterweight.

The counterweight 41 and the counterweight's guiding surfaces are represented in more detail in FIGS. 2 and 3. In this embodiment, the counterweight 41 is constituted of a metallic cylinder, for example a steel cylinder, having a mass equal that of the carriage 3 and of the elements that are moved with the carriage. The fastening point of the counterweight 41 on the belt is perfectly centered so as to ensure the counterweight's verticality. It is desirable to limit the counterweight's length, as this allows to reduce the risk of collisions when the counterweight is not perfectly vertical and furthermore to increase the possible course for a given height of the supporting frame. For this purpose, the counterweight's diameter is preferably close to the maximal diameter that can be inserted in the hollow of the supporting frame 2.

When stationary, the counterweight 41 and the carriage 3 are thus hung on each side of the upper pulley 42; the masses are at equilibrium so that the driving belt 40 exerts no torque on this pulley. The equal masses of the counterweight and of the carriage are sufficient for the driving belt 40 not to slip on the driving pulley 42. Significant masses however cause forces and moments on the carriage that could disturb the measuring. In the case of a belt of composite synthetic material and a driving surface of the pulley of eloxed aluminum, conclusive trials have been performed with masses on the order of 950 grams. Other conclusive trials have been performed with a steel belt.

The counterweight 41 is provided with two rubber joints (o-ring) 410 that slightly protrude on its outer side. These joints act as a dampening for absorbing the possible collisions that can nevertheless occur between the counterweight and the guiding surface. The oscillations provoked by these collisions thus die faster and the noise of the shock, amplified by the tube 26, is muffled thanks to the rubber. Preferably, several o-ring joints will be provided on the top and on the bottom of the counterweight 41 when the latter's length is considerable and it could move in a slightly oblique manner.

The belt 40 is fastened to the lower extremity of the counterweight 41 by means of a headless screw 411 or of a pin holding the belt in a slit 416. A device for regulating the tension of the belt 40 is provided at the other extremity of the counterweight 41. In the represented embodiment, this device comprises a headless screw 412 screwed and preferably glued in the counterweight 41. An angled element 414 slides along the rod 412 and in a slit 417 in the counterweight. Thanks to a nut 413, the angled element 414 can be moved towards the counterweight 41 so as to tense the belt that is fastened against the angled element by means of a screw 415.

In the represented embodiment, the guiding surfaces of the counterweight 41 are constituted by the inner side 260 of a cylindrical tube 26 mounted inside the supporting frame 2. As indicated above, the play between the maximal radius of the counterweight—at the level of the o-ring joint 410—and the inner surface of the guiding tube is preferably comprised between 0.2 and 5 millimeters, preferably between 0.5 and 2.0 millimeters, for example 1 millimeter. The length of the guiding tube is equal to or greater than the course of the counterweight and thus depends on the height of the measuring column.

The guiding tube 26 is mounted in the supporting frame 2 by means of screws 261. In the represented embodiment, three screws 261 are placed close to the top of the tube and three additional screws close to its base. These screws are provided with convex elastic washers 262 and enable the verticality of the tube 26 to be adjusted in both axes, so as to ensure that the counterweight 41 moves without collisions during its entire course. The regulated screws are preferably blocked by means of a point of glue or of a screw braking product. It would also be possible to use a different number of elements for regulating the perpendicularity, for example two screws at the top and at the base of the column. The verticality of the supporting frame 2 can itself be previously adjusted, for example by regulating the parallelism between the base 20 and the working surface by means of adjustable feet (not represented) or preferably by adapting the perpendicularity between the base 20 and the supporting frame 2 by means of regulating screws under the base's bottom.

In the represented embodiment, the counterweight's section is round and it is guided by the inner sides of a cylindrical tube 26. This arrangement has the advantage of using extruded or lathe-turned forms that are not too expensive to manufacture accurately. It will however be understood that other shapes of the counterweight, for example counterweights with rectangular or oval sections, and of guiding surfaces can be used, sections that are not round having the advantage of preventing the counterweight from rotating on its longitudinal axis. It is also possible to device guiding surfaces that do not encircle the entire counterweight. For example one or several vertical bands or rods having guiding surfaces reduced to lines, or even discrete guiding points along the counterweight's course, for example several screws in the supporting frame. These variant embodiments however have the disadvantage of requiring each guiding point or surface to be regulated and aligned, which increases the cost of the assembly. Furthermore, a considerable number of rods or points must be provided to prevent any swinging in all the possible directions along the counterweight's course.

In a variant embodiment, it would also be possible to use surfaces of the supporting frame 2, for example the inner sides of this supporting frame, to guide the counterweight. This embodiment however has the disadvantage of requiring an accurate and expensive manufacturing of this relatively massive piece. As the measuring precision depends for an important part on the rigidity of the supporting frame, the latter is often made of cast iron and is thus difficult to manufacture accurately.

The counterweight could also be provided with one or several longitudinal openings and be guided by one or several vertical rods connected to the supporting frame and traversing these openings with a play. The manufacturing of these openings however increases the cost of this construction. Furthermore, it is difficult to place dampening surfaces, for example rubber joints, inside these openings.

Finally, it will be understood that it is possible to use several counterweights hung next to one another or under one another, and/or to connect the carriage with the counterweight or counterweights by means of several cables or belts.

What is claimed is:

1. Column for measuring longitudinal dimensions comprising:

a supporting frame, a carriage capable of moving along a measuring axis along the supporting frame, a cable or belt for moving said carriage along said measuring axis, a counterweight connected to said cable or belt so as to move in opposite direction from the carriage, a guiding surface for restricting the counterweight's movements, comprising a spacing between said counterweight and said guiding surface sufficient to avoid any contact between said counterweight and any guiding surface when said counterweight is displaced vertically, comprising at least a dampening surface for absorbing possible collisions between said counterweight and said guiding surface.

2. The column of claim 1, wherein said dampening surface comprises an O-ring joint around said counterweight.

3. The measuring column of claim 1, comprising elements for regulating the verticality of said guiding surface.

4. The measuring column of claim 3, comprising at least one screw for regulating the top position of said guiding surface.

5. The measuring column of claim 4, comprising at least two screws for regulating the top position of said guiding surface along two axes.

6. The measuring column of claim 5, comprising at least one screw for regulating the bottom position of said guiding surface.

7. The measuring column of claim 6, comprising at least two screws for regulating the bottom position of said guiding surface along two axes.

8. The measuring column of claim 7, said screw or screws being provided with elastic washers.

9. The measuring column of claim 3, said spacing being less than 2 millimeters.

10. The measuring column of claim 5, said tube being placed inside said supporting frame.

11. The measuring column of claim 1, said spacing being less than 5 millimeters.

12. The measuring column of claim 1, said guiding surface being constituted by at least part of the inner side of a tube.

13. Column for measuring longitudinal dimensions comprising:

a supporting frame, a carriage capable of moving along a measuring axis along the supporting frame, a cable or belt for moving said carriage along said measuring axis, a counterweight connected to said cable or belt so as to move in opposite direction from the carriage, said counterweight having an outer surface, a guiding surface for restricting the counterweight's movements, said guiding surface substantially surrounding said counterweight and being substantially equally spaced from the outer surface of said counterweight to provide a spacing between said counterweight and said guiding surface sufficient to avoid substantially any contact between said counterweight and any guiding surface when said counterweight is displaced vertically.

* * * * *